April 7, 1925.  
H. R. PUFFER  
1,532,944  
OIL LEVEL INSPECTION ATTACHMENT  
Filed June 16, 1924    2 Sheets-Sheet 1

INVENTOR.  
H. R. Puffer,  
BY  
Geo. P. Kimmel.  
ATTORNEY.

April 7, 1925.
H. R. PUFFER
OIL LEVEL INSPECTION ATTACHMENT
Filed June 16, 1924
1,532,944
2 Sheets-Sheet 2
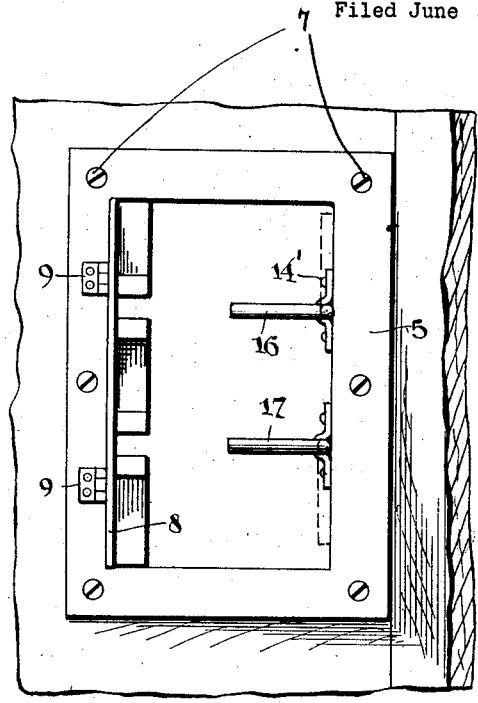
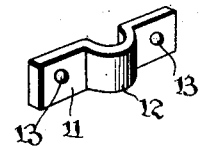
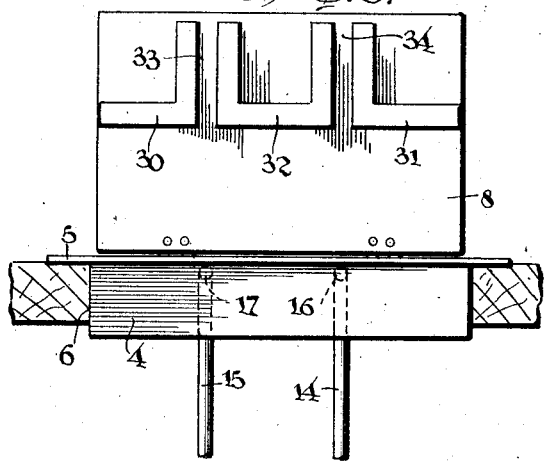
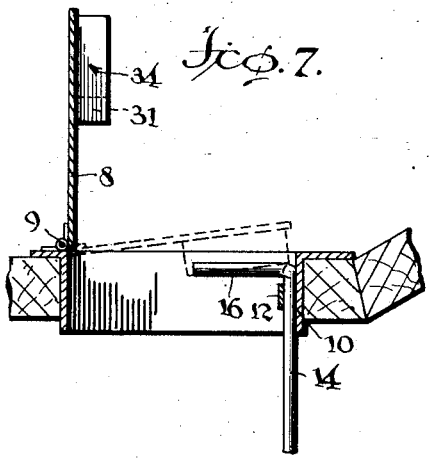
INVENTOR.
H. R. Puffer,
BY
Geo. F. Kimmel
ATTORNEY.

Patented Apr. 7, 1925.

1,532,944

UNITED STATES PATENT OFFICE.

HAROLD R. PUFFER, OF JEFFERSON, IOWA.

OIL-LEVEL-INSPECTION ATTACHMENT.

Application filed June 16, 1924. Serial No. 720,279.

*To all whom it may concern:*

Be it known that I, HAROLD R. PUFFER, a citizen of the United States, residing at Jefferson, in the county of Greene and State of Iowa, have invented certain new and useful Improvements in Oil-Level-Inspection Attachments, of which the following is a specification.

This invention relates to an oil level inspection attachment, designed primarily for use in connection with motor vehicles of the "Ford" type, but it is to be understood that an attachment, in accordance with this invention, can be employed with any type of motor vehicle for which it is found applicable, and the invention has for its object to provide an attachment of the class referred to, in a manner as hereinafter set forth, with means whereby the oil cocks can be conveniently opened and viewed from the driving compartment of the vehicle to ascertain the oil level, and under such conditions overcoming the inconvenience of getting under the vehicle body as is generally now the case, when an inspection of the oil level is desired.

A further object of the invention is to provide, in a manner as hereinafter set forth, an oil lever inspection attachment, having means to assure that the oil cocks are closed after an inspection has been made.

Further objects of the invention are to provide, in a manner as hereinafter set forth, an oil level inspection attachment, which is simple in its construction and arrangement, strong, durable, readily installed with respect to the motor vehicle body and oil cocks, thoroughly convenient and efficient in its use, and comparatively inexpensive to set up.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 5 is a fragmentary view, in plan, of the floor board of a motor vehicle, showing the adaptation therewith of an oil level inspection attachment in accordance with this invention, and with the attachment shown in top plan and the hinged cover thereof elevated.

Figure 6 is a fragmentary view, in front elevation, of the attachment and with the hinged cover thereof elevated.

Figure 7 is a fragmentary view in cross section, illustrating the attachment in full lines in inoperative position and further illustrating the hinged cover in dotted lines seating on the handles of the turning rod to indicate that the oil cocks are open.

Figure 8 is a perspective view of a retaining member for an oil cock turning rod.

Figure 1:
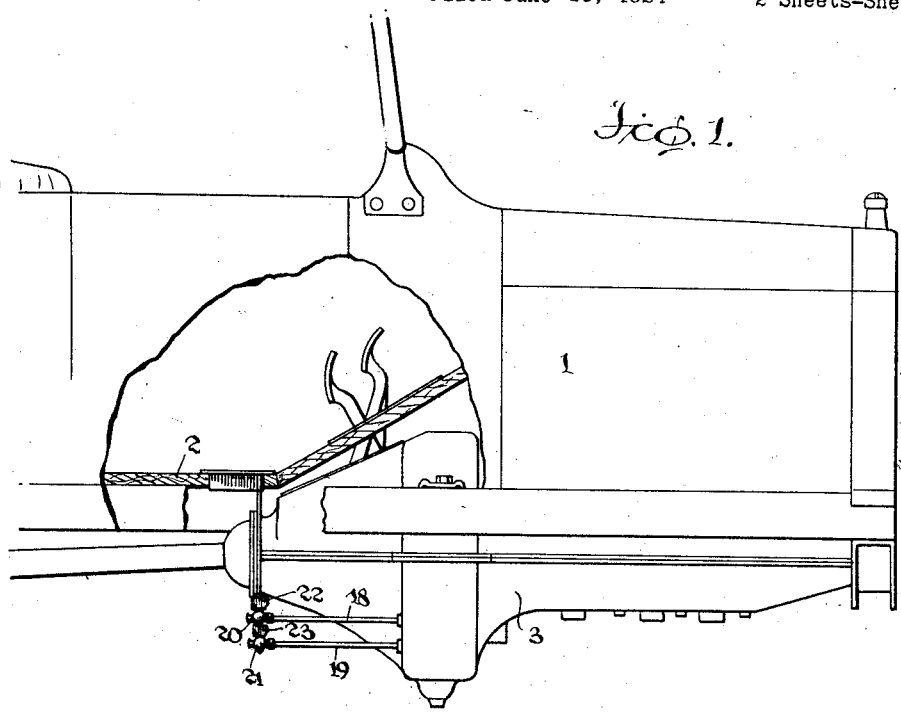
Figure 1 is a fragmentary view, partly in section, of a motor vehicle, showing the adaptation therewith of an oil level inspection attachment in accordance with this invention.
Figure 2:
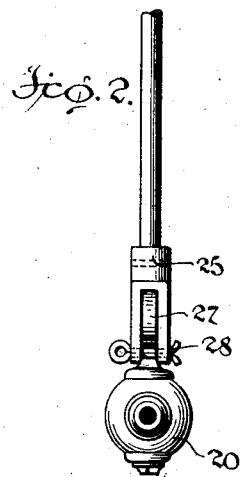
Figure 2 is an edge view of an oil cock turning rod showing the adaptation thereof in connection with the cock.
Figure 3:
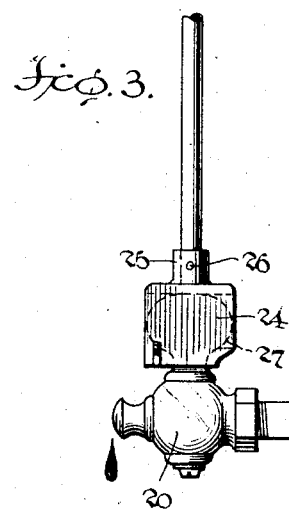
Figure 3 is a side elevation of an oil cock turning rod showing the adaptation thereof in connection with the cock.
Figure 4:
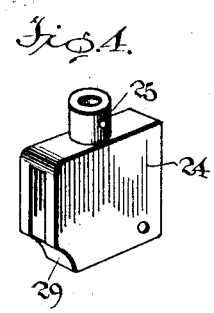
Figure 4 is a perspective view of an oil cock turning member carried by a turning rod.

Referring to the drawings in detail, 1 denotes a motor vehicle, 2 the floor board of the driving compartment thereof, and 3 the motor. The foregoing elements are of known construction.

An attachment in accordance with this invention comprises a rectangular frame 4, provided at its top with a laterally extending continuous flange 5. The frame 4 is positioned in an opening 6 formed in the floor board 2 and the flange 5 is seated upon the upper face of the floor board 2. Preferably the frame 4 is of a height to depend below the lower face of the floor board 2.

The frame 4 is secured to the floor board 2, through the medium of hold-fast devices 7 which extend through the flange 5 and engage with the board 2. Hinged to that portion of the flange 5 which extends rearwardly from the frame 4, is a closure or cover plate 8, and which conforms in contour to the shape of the opening formed by the frame 4. The hinged connections between the plate 8 and the flange 7 are indicated at 9.

Secured to the inner face of the front bar 10 of the frame 4, is a pair of spaced retaining members 11, each provided intermediate its ends with a rearwardly directed semicircular intermediate portion 12. Each of the members 11 is provided with openings 13 for the passage of hold-fast devices 14' to fixedly secure the members to the bar 10. The semi-circular intermediate portion 12 of each of the members 11 is positioned at a point between the transverse center and one end of the frame 4.

Extending between the semi-circular portions 12 of the members 11 and the frame bar 10, are oil cock turning rods and one of said rods is indicated at 14 and the other at 15. The rod 14 has its upper end provided with a crank handle 16 and the rod 15 has its upper end provided with a crank handle 17. The handles 16 and 17 are disposed at right angles with respect to said rods and are positioned above the members 11. When the rods 14 and 15 are shifted to close the oil cocks, to be presently referred to, the handles 16 and 17 will be positioned to extend rearwardly with respect to the frame bar 10 and at right angles thereto, see Figure 5, and when the rods 14 and 15 are shifted to open the oil cocks they extend in a position parallel to the inner face of the frame bar 10, as shown in dotted lines in Figure 5.

Extended rearwardly from the motor casing, as well as communicating therewith, is a pair of oil conducting pipes 18, 19, and with the former having its free end provided with an oil cock 20 and the latter with an oil cock 21. Mounted on and detachably connected to the cock 20 is a turning member 22 therefor, and mounted on and detachably connected to the cock 21 is a turning member 23 therefor. Each of said turning members is of the same construction, and but one will be described, as the description of one will apply to the other. Each of said turning members consists of an inverted yoke-shaped body portion 24 provided with a tubular extension 25 at the top thereof and which constitutes a socket for the reception of the lower end of a turning rod and with the latter secured to the extension 25 by a pin 26. The body portion 24 is adapted to be slipped upon the turning head 27 of the cock, as well as being detachably connected therewith through the medium of a cotter pin 28, which is positioned in proximity to one lower corner of the body portion 24 and arranged below the head 27. The rear lower corner of the body portion 24 is closed, as at 29.

The inner face of the plate 8 has formed integral therewith a pair of oppositely extending angle-shaped ribs 30, 31 and a yoke-shaped rib 32. The rib 30 is spaced a substantial distance from the rib 32, as at 33, and the 31 is spaced a substantial distance from the rib 32, as at 34. The spaces 33 and 34 provide clearances for the crank handles 16 and 17 when the cocks 20 and 21 are in closed position, and when in closed position the crank handles 16 and 17 extend rearwardly at right angles to the frame bar 10, so that when the plate 8 is moved to closed position, the handle 16 enters the space between the ribs 31 and 32, and the handle 17 enters the space between the ribs 30 and 32. If the turning rods 14 and 15 have been actuated to open the cocks 20 and 21, the handles 16 and 17 will be in the position shown in dotted lines, Figure 5, so that when the plate 8 is moved, the ribs 30 and 31 will engage the handles 16 and 17 and the plate 8 will be prevented from closing, see dotted line position in Figure 7, and this will indicate to the operator that the oil cocks 20 and 21 are open. If the handle 16 or 17 is swung to dotted line position opposite to the dotted line position shown in Figure 5, then the rib 32 would contact with such handle and prevent the plate 8 from closing. In view of the foregoing, it is obvious that a means is set up to assure the operator of the vehicle when the oil cocks are in open or closed position. The ribs, when the plate is closed, oppose the handles 16 and 17 and prevent turning of the rods to open the cocks. The rods cannot be actuated to open the cocks, until the ribs are clear of the handles, and which cannot be had until the plate is swung open sufficiently for such purpose.

When it is desired to inspect the level of the oil in the motor, the plate 8 is elevated to the position shown in Figure 6, and the operator can then view the oil cocks through the floor board 2. The handles 16 and 17 can be grasped and the rods 14 and 15 actuated to provide for the members 22 and 23 to open the cocks 20 and 21. If there is no discharge of oil through the cocks, then the operator will know that the oil level is below normal. If there is a discharge of oil then the operator will understand that no supply is necessary. After the cocks have been restored to normal position, which is closed, the plate 8 is then shifted to closed position with respect to the frame 4.

The oil level inspection attachment in accordance with this invention, provides means whereby the oil cocks can be conveniently operated and viewed through the floor board, thus preventing the inconvenience of getting under the vehicle to open and close the cocks, and said attachment further includes means for locking the turning rods to maintain the cocks closed, as well as to assure the driver or operator when the oil cocks are closed or open, due to the fact that the plate 8 will only seat when the cocks are closed and will extend at an upward inclination, see Figure 130

7, if the cocks are open, therefore, it is thought that the many advantages of an attachment in accordance with this invention can be readily understood, and although the preferred embodiment of the invention is as illustrated and described, yet changes in the details of construction can be had which will fall within the scope of the invention as claimed.

What I claim is:—

1. An oil level inspection attachment for motor vehicles comprising a frame adapted to be secured to and extend through the floor board of a motor vehicle and provided with a closure plate therefor, and shiftable means pivotally connected to and depending from the inner face at one end of said frame for opening and closing the oil cocks.

2. An oil level inspection attachment for motor vehicles comprising a frame adapted to be secured to and extend through the floor board of a motor vehicle and provided with a closure plate therefor hinged to the top thereof, shiftable means pivotally connected to and depending from the inner face at one end of said frame for opening and closing the oil cocks, and said plate having its lower face at one end thereof provided with means to prevent the seating of the plate by said means when the oil cocks are open to indicate that the cocks are in such position.

3. An oil level inspection attachment for motor vehicles comprising a flanged frame adapted to be secured to and extend through the floor board of a motor vehicle and providing a viewing opening for the oil cocks, a plate hinged to the flange of said frame at the rear thereof for closing the opening formed thereby, a pair of vertical turning rods shiftably suspended from the inner face of the forward end of said frame and each provided with a rearwardly extending crank handle at its top, and means connected with the lower ends of said rods and adapted to be connected with the oil cocks for shifting them to open and closed position on the actuation of said rods.

4. An oil level inspection attachment for motor vehicles comprising a flanged frame adapted to be secured to and extend through the floor board of a motor vehicle and providing a viewing opening for the oil cocks, a plate hinged to the flange of said frame at the rear thereof for closing the opening formed thereby, a pair of vertical turning rods shiftably suspended from the inner face of the forward end of said frame and each provided with a rearwardly extending crank handle at its top, means connected with the lower ends of said rods and adapted to be connected with the oil cocks for shifting them to open and closed position on the actuation of said rods, and means depending from the lower face of said plate at the forward end thereof and coacting with the crank handles of said rods to indicate when the oil cocks are in open position.

5. An oil level inspection attachment for motor vehicles comprising a frame adapted to be secured to the floor board of the motor vehicle and providing an opening for the viewing of the oil cocks of the vehicle, turning members adapted to be detachably connected with the oil cocks of the vehicle, vertically extending turning rods depending from and positioned against the inner face of the forward end of said frame and further connected with said members, retaining members secured against said inner face for pivotally connecting said rods to said frame, each of said rods having its upper end provided with a rearwardly extending crank handle, and a closure plate hinged to said frame for closing the opening formed thereby.

6. An oil level inspection attachment for motor vehicles comprising a frame adapted to be secured to the floor board of the motor vehicle and providing an opening for the viewing of the oil cocks of the vehicle, turning members adapted to be detachably connected with the oil cocks of the vehicle, vertically extending turning rods depending from and positioned against the inner face of the forward end of said frame and further connected with said members, retaining members secured against said inner face for pivotally connecting said rods to said frame, each of said rods having its upper end provided with a rearwardly extending crank handle, a closure plate hinged to the top of the rear end of said frame for closing the opening formed thereby, and said plate provided with means depending from its inner face at the forward end thereof and coacting with said handles to indicate when the oil cocks are open.

7. An oil level inspection attachment for motor vehicles, comprising a rectangular frame adapted to extend through the floor board of a motor vehicle and formed at its top with a laterally extending supporting flange seating on the upper face of said floor board, said frame providing an opening for the viewing of the oil cocks of the vehicle, turning members adapted to be detachably connected with the oil cocks of the vehicle, vertically extending turning rods depending from and positioned against the inner face of the forward end bar of said frame and further connected with said members, retaining members secured against the inner face of said forward end bar and pivotally connecting said rods to said frame, each of said rods having its upper end provided with a rearwardly extending crank handle supported on a retaining member, and a closure plate hinged to the flange extended from the rear end bar of the frame and providing means for closing the openings formed by the latter.

8. An oil level inspection attachment for motor vehicles, comprising a rectangular frame adapted to extend through the floor board of a motor vehicle and formed at its top with a laterally extending supporting flange seating on the upper face of said floor board, said frame providing an opening for the viewing of the oil cocks of the vehicle, turning members adapted to be detachably connected with the oil cocks of the vehicle, vertically extending turning rods depending from and positioned against the inner face of the forward end bar of said frame and further connected with said members, retaining members secured against the inner face of said forward end bar and pivotally connecting said rods to said frame, each of said rods having its upper end provided with a rearwardly extending crank handle supported on a retaining member, and a closure plate hinged to the flange extended from the rear end bar of the frame and providing means for closing the opening formed by the latter, said plate having means depending from its lower face at the forward end thereof and coacting with said handles to indicate when the oil cocks are open.

In testimony whereof, I affix my signature hereto.

HAROLD R. PUFFER.